United States Patent
Zhang et al.

(10) Patent No.: US 12,006,806 B2
(45) Date of Patent: *Jun. 11, 2024

(54) FRACTURING APPARATUS AND FRACTURING SYSTEM

(71) Applicant: YANTAI JEREH PETROLEUM EQUIPMENT & TECHNOLOGIES CO., LTD., Shandong (CN)

(72) Inventors: Rikui Zhang, Shandong (CN); Xiance Li, Shandong (CN); Xincheng Li, Shandong (CN); Chunqiang Lan, Shandong (CN); Yipeng Wu, Shandong (CN); Zhuqing Mao, Shandong (CN); Sheng Chang, Shandong (CN); Xiaolei Ji, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,150

(22) Filed: Dec. 9, 2022

(65) Prior Publication Data

US 2023/0106683 A1    Apr. 6, 2023

Related U.S. Application Data

(63) Continuation of application No. 17/542,330, filed on Dec. 3, 2021, which is a continuation-in-part of
(Continued)

(30) Foreign Application Priority Data

| Dec. 4, 2020 | (CN) | .................. | 202011396988.X |
| Apr. 20, 2021 | (CN) | .................. | 202110426496.9 |

(51) Int. Cl.
*E21B 43/26* (2006.01)
*B01F 101/49* (2022.01)
(Continued)

(52) U.S. Cl.
CPC .......... *E21B 43/2607* (2020.05); *E21B 43/26* (2013.01); *F02C 7/14* (2013.01);
(Continued)

(58) Field of Classification Search
CPC ........ E21B 43/2607; E21B 43/26; F02C 7/14; F02C 7/24; F02C 7/26; F04B 17/05;
(Continued)

(56) References Cited

U.S. PATENT DOCUMENTS

| 8,794,307 B2 | 8/2014 | Coquilleau et al. |
| 10,030,579 B2 | 7/2018 | Austin et al. |

(Continued)

FOREIGN PATENT DOCUMENTS

| CN | 102602323 A | 7/2012 |
| CN | 205936568 U | 2/2017 |

(Continued)

OTHER PUBLICATIONS

International Search Report dated Jun. 5, 2020 for International Application No. PCT/CN2019/107021, including English translation.

(Continued)

*Primary Examiner* — James G Sayre
(74) *Attorney, Agent, or Firm* — Crowell & Moring LLP

(57) ABSTRACT

A fracturing apparatus and a fracturing system are provided. The fracturing apparatus includes: a plunger pump configured to pressurize a fracturing fluid to form a high-pressure fracturing fluid; a turbine engine coupled to the plunger pump and configured to provide a driving force to the plunger pump; an auxiliary unit including a driving electric motor, the auxiliary unit being configured to provide the fracturing apparatus with at least one selected from the group consisting of start-up assist function, lubrication function, cooling function, and air supply function; and a power (Continued)

supply electrically coupled to the driving electric motor of the auxiliary unit to provide driving power.

20 Claims, 12 Drawing Sheets

Related U.S. Application Data application No. PCT/CN2019/107021, filed on Sep. 20, 2019.

(60) Provisional application No. 63/123,625, filed on Dec. 10, 2020.

(51) Int. Cl.
| | | |
|---|---|---|
| *F02C 7/14* | (2006.01) | |
| *F02C 7/24* | (2006.01) | |
| *F02C 7/26* | (2006.01) | |
| *F04B 17/05* | (2006.01) | |
| *F04B 53/18* | (2006.01) | |

(52) U.S. Cl.
CPC ............... *F02C 7/24* (2013.01); *F02C 7/26* (2013.01); *F04B 17/05* (2013.01); *F04B 53/18* (2013.01); *B01F 2101/49* (2022.01)

(58) Field of Classification Search
CPC .......... F04B 53/18; F04B 17/06; F04B 17/03; F04B 53/08; B01F 2101/49
See application file for complete search history.

(56) References Cited

U.S. PATENT DOCUMENTS

| | | |
|---|---|---|
| 10,883,352 B2 | 1/2021 | Headrick |
| 10,961,914 B1 | 3/2021 | Yeung et al. |
| 11,111,768 B1 | 9/2021 | Yeung et al. |
| 11,512,632 B2 | 11/2022 | Morris et al. |
| 2014/0174717 A1 | 6/2014 | Broussard et al. |
| 2020/0347725 A1 | 11/2020 | Morris et al. |
| 2021/0079902 A1 | 3/2021 | Yeung |
| 2022/0090477 A1* | 3/2022 | Zhang ..................... F02C 7/24 |

FOREIGN PATENT DOCUMENTS

| | | |
|---|---|---|
| CN | 109882144 A | 6/2019 |
| CN | 110118127 A | 8/2019 |
| CN | 110469314 A | 11/2019 |
| CN | 110485982 A | 11/2019 |
| CN | 111206992 A | 5/2020 |
| CN | 210565028 U | 5/2020 |
| CN | 210889242 U | 6/2020 |
| JP | 4495603 B2 | 7/2010 |

OTHER PUBLICATIONS

Written Opinion dated Jun. 5, 2020 for International Application No. PCT/CN2019/107021, including English translation.
Non-final Office Action dated Jul. 27, 2023 in U.S. Appl. No. 17/542,330.

* cited by examiner

FRACTURING APPARATUS AND FRACTURING SYSTEM

CROSS-REFERENCES TO THE RELATED APPLICATIONS

For all purposes, the present application is a continuation application of U.S. Non-Provisional patent application Ser. No. 17/542,330, filed on Dec. 3, 2021, which claims the benefit of priority to (1) Chinese Patent Application No. 202011396988.X, filed on Dec. 4, 2020, (2) U.S. Provisional Patent Application No. 63/123,625, filed on Dec. 10, 2020, and (3) Chinese Patent Application No. 202110426496.9, filed on Apr. 20, 2021. U.S. Non-Provisional patent application Ser. No. 17/542,330 is also a continuation-in-part application of PCT/CN2019/107021 filed on Sep. 20, 2019. These prior patent applications are incorporated herein by reference as part of the present application in their entireties.

TECHNICAL FIELD

Embodiments of the present disclosure relate to a fracturing apparatus and a fracturing system.

BACKGROUND

Fracturing is a major approach to increase the production in oil and gas fields. The existing fracturing well site layout substantially includes turbine-driven well site layout, electrically-driven well site layout and conventional diesel driven well site layout.

SUMMARY

Embodiments of the present disclosure provide a fracturing apparatus and a fracturing system.

In one aspect, at least one embodiment of the present disclosure provides a fracturing apparatus, which includes: a plunger pump configured to pressurize a fracturing fluid to form a high-pressure fracturing fluid; a turbine engine coupled to the plunger pump and configured to provide a driving force to the plunger pump; an auxiliary unit including a driving electric motor, the auxiliary unit being configured to provide the fracturing apparatus with at least one selected from the group consisting of start-up assist function, lubrication function, cooling function and air supply function; and a power supply electrically coupled to the driving electric motor of the auxiliary unit to provide driving power.

For example, the auxiliary unit includes a start-up unit configured to start up the turbine engine, and the driving electric motor includes a start-up electric motor.

For example, the start-up electric motor is configured to directly start up the turbine engine and directly connected with the turbine engine, and the start-up unit is disposed on the turbine engine.

For example, the auxiliary unit further includes a lubricating unit and a cooling unit, the driving electric motor further includes a lubricating electric motor and a cooling electric motor, the lubricating unit further includes a lubricating pump, and a lubricating oil tank, and the lubricating electric motor is configured to drive the lubricating pump to convey lubricating oil in the lubricating oil tank to a lubricating point, the cooling unit further includes a cooler, and the cooling electric motor is configured to drive the cooler to cool the lubricating oil, and the lubricating electric motor is directly connected with the lubricating pump, and the cooling electric motor is directly connected with the cooler.

For example, the auxiliary unit further includes an air supply unit, the driving electric motor includes an air supply electric motor, the air supply unit further includes an air compressor, and the air supply electric motor is configured to drive the air compressor to provide air with a predetermined pressure to the turbine engine, and the air supply electric motor is directly connected with the air compressor.

For example, the fracturing apparatus further includes a ventilating unit, the driving electric motor includes a ventilating electric motor, the ventilating unit further includes a ventilating part, the ventilating electric motor is configured to drive the ventilating part, and the ventilating electric motor is directly connected with the ventilating part.

For example, the power supply includes at least one selected from the group consisting of a generator, grid electricity, fuel battery, and an energy storage battery, and the power supply is electrically connected with the driving electric motor via a switch cabinet and a transformer substation.

For example, the fracturing apparatus further includes a carrier on which the plunger pump, the turbine engine and at least a part of the auxiliary unit are provided, the plunger pump is detachably fixed on the carrier.

For example, the plunger pump is fixed on a first base provided with a first forklift slot, and the plunger pump is detachably fixed on the carrier through the first base.

For example, the cooler is arranged above the plunger pump.

For example, the fracturing apparatus further includes a muffler, the turbine engine includes an exhaust pipe, the muffler is connected with the exhaust pipe, and the cooler is arranged at a side of the muffler away from the exhaust pipe.

For example, an interval is provided between the cooler and the muffler, and an air outlet side of the cooler faces the muffler.

For example, the fracturing apparatus further includes a baffle, the baffle is arranged at an outer side of the muffler and is at least partially located between the muffler and the cooler, the baffle includes a plurality of holes, and a distance between the baffle and the muffler is smaller than a distance between the baffle and the cooler.

For example, the muffler includes a first side surface, a second side surface, and a third side surface, the first side surface faces the cooler, the second side surface and the third side surface are connected with the first side surface, respectively, and the baffle is located at the outer side of the first side surface, the second side surface, and the third side surface of the muffler.

At least one embodiment of the present disclosure provides a fracturing system including any one of the fracturing apparatuses as described above and a peripheral apparatus, the power supply being configured to be connected with the peripheral apparatus to supply electric power to the peripheral apparatus.

For example, the peripheral apparatus includes at least one selected from the group consisting of a fracturing fluid mixing apparatus, a sand mixing apparatus, and a conveying mechanism, the fracturing fluid mixing apparatus is configured to mix a fracturing base fluid, the sand mixing apparatus is configured to mix a proppant and the fracturing base fluid to form the fracturing fluid, and the conveying mechanism is configured to convey the proppant stored in a sand silo to the sand mixing apparatus.

For example, a plurality of fracturing apparatuses are provided, the plunger pump of at least one of the plurality of fracturing apparatuses is replaced by an electric generator to form at least a part of the power supply.

For example, the electric generator is fixed on a second base which is provided with a second forklift slot.

In another aspect, at least one embodiment of the present disclosure provides a fracturing apparatus including a plunger pump configured to pressurize a fracturing fluid to form a high-pressure fracturing fluid; a turbine engine coupled to the plunger pump and configured to provide a driving force to the plunger pump; the turbine engine includes an exhaust pipe; a lubricating unit configured to convey lubricating oil to a lubricating point; a cooling unit includes a cooler configured to cool the lubricating oil; a muffler connected with the exhaust pipe, the cooler being arranged at a side of the muffler and configured such that the air discharged from the cooler flows toward the muffler.

For example, in the fracturing apparatus provided by the embodiments of the present disclosure, the cooler is arranged at a side of the muffler away from the exhaust pipe.

For example, in the fracturing apparatus provided by the embodiments of the present disclosure, an interval is provided between the cooler and the muffler, and an air outlet side of the cooler faces the muffler.

For example, in the fracturing apparatus provided by the embodiments of the present disclosure, the fracturing apparatus further includes a baffle, the baffle is arranged at an outer side of the muffler and is at least partially located between the muffler and the cooler, the baffle includes a plurality of holes, and a distance between the baffle and the muffler is smaller than a distance between the baffle and the cooler.

For example, in the fracturing apparatus provided by the embodiments of the present disclosure, the muffler includes a first side surface, a second side surface, and a third side surface, the first side surface faces the cooler, the second side surface and the third side surface are connected with the first side surface, respectively, and the baffle is located at the outer side of the first side surface, the second side surface, and the third side surface of the muffler.

For example, in the fracturing apparatus provided by the embodiments of the present disclosure, the cooler is arranged above the plunger pump.

For example, in the fracturing apparatus provided by the embodiments of the present disclosure, the cooler is arranged obliquely with respect to an axis of the plunger pump.

For example, in the fracturing apparatus provided by the embodiments of the present disclosure, the lubricating unit includes a lubricating electric motor, a lubricating pump, and a lubricating oil tank, the lubricating electric motor is configured to drive the lubricating pump to convey the lubricating oil in the lubricating oil tank to a lubricating point, the cooling unit further includes a cooling electric motor, and the cooling electric motor is configured to drive the cooler to cool the lubricating oil, and the lubricating electric motor is directly connected with the lubricating pump, and the cooling electric motor is directly connected with the cooler.

For example, in the fracturing apparatus provided by the embodiments of the present disclosure, the fracturing apparatus further includes a start-up unit configured to start up the turbine engine, and the start-up unit includes a start-up electric motor.

For example, in the fracturing apparatus provided by the embodiments of the present disclosure, the start-up electric motor is configured to directly start up the turbine engine, the start-up electric motor is directly connected with the turbine engine, and the start-up unit is disposed on the turbine engine.

For example, in the fracturing apparatus provided by the embodiments of the present disclosure, the fracturing apparatus further includes an air supply unit, the air supply unit includes an air compressor and an air supply electric motor, and the air supply electric motor is configured to drive the air compressor to provide air with a predetermined pressure to the turbine engine, and the air supply electric motor is directly connected with the air compressor.

For example, in the fracturing apparatus provided by the embodiments of the present disclosure, the fracturing apparatus further includes a ventilating unit, the ventilating unit further includes a ventilating electric motor and a ventilating part, the ventilating electric motor is configured to drive the ventilating part, and the ventilating electric motor is directly connected with the ventilating part.

For example, in the fracturing apparatus provided by the embodiments of the present disclosure, the fracturing apparatus further includes a power supply, and the lubricating electric motor, the cooling electric motor, the start-up electric motor, the air supply electric motor, the ventilating electric motor are electrically connected with the power supply, respectively.

At least one embodiment of the present disclosure provides a fracturing system including: any one of the fracturing apparatuses as described above; and a peripheral apparatus, and the power supply is configured to be connected with the peripheral apparatus to supply electric power to the peripheral apparatus.

For example, in the fracturing system provided by the embodiments of the present disclosure, the peripheral apparatus includes at least one selected from the group consisting of a fracturing fluid mixing apparatus, a sand mixing apparatus, and a conveying mechanism, the fracturing fluid mixing apparatus is configured to mix a fracturing base fluid, the sand mixing apparatus is configured to mix the fracturing base fluid and a proppant to form the fracturing fluid, and the conveying mechanism is configured to convey the proppant stored in a sand silo to the sand mixing apparatus.

In another aspect, embodiments of the present disclosure provide a fracturing apparatus, which includes: a plunger pump configured to pressurize a fracturing fluid and convey the pressurized fracturing fluid to a well head; a turbine engine coupled to the plunger pump and configured to provide a driving force to the plunger pump; an auxiliary unit including a driving electric motor, the auxiliary unit being configured to provide the fracturing apparatus with start-up assist, lubrication, cooling and/or air supply; and a power supply electrically coupled to the driving electric motor of the auxiliary unit to provide driving power to the auxiliary unit.

In one embodiment, the auxiliary unit at least includes: a start-up unit disposed on the turbine engine to assist the turbine engine to start, a lubricating unit including a lubricating pump, a lubricating oil tank and a lubricating electric motor configured to drive the lubricating pump to convey the lubricating oil in the lubricating oil tank to a lubricating point, a cooling unit including a cooler and a cooling electric motor configured to drive the cooler to cool the lubricating oil, and an air supply unit including an air compressor and an air supply electric motor configured to drive the air compressor to provide air with a predetermined pressure to the turbine engine; the power supply is electrically coupled to the start-up unit, the lubricating electric motor, the cooling electric motor and the air supply electric motor, respectively.

In one embodiment, the power supply includes a generator, grid electricity and/or an energy storage battery.

In one embodiment, the fracturing apparatus further includes a carrier on which the plunger pump, the turbine engine and at least a part of the auxiliary unit are integrally provided, the plunger pump is detachably fixed on the carrier.

In one embodiment, the plunger pump is fixed on a first base provided with a first forklift slot, the plunger pump being detachably fixed on the carrier through the first base.

In one embodiment, the power supply is electrically coupled to the driving electric motor via a switch cabinet and a transformer substation successively.

According to another aspect of the embodiments of the present disclosure, a fracturing system includes: a fracturing fluid mixing apparatus configured to mix a fracturing base fluid, a sand mixing apparatus in fluid communication with the fracturing fluid mixing apparatus and configured to mix the fracturing base fluid and a proppant to form a fracturing fluid, and a fracturing apparatus according to any one of the above, the fracturing apparatus is in fluid communication with the sand mixing apparatus.

In one embodiment, the power supply of the fracturing apparatus is electrically coupled to the fracturing fluid mixing apparatus and/or the sand mixing apparatus to provide electric power thereto.

In one embodiment, the fracturing system further includes a sand silo configured to store the proppant and conveying the proppant to the sand mixing apparatus via a conveying mechanism which is electrically coupled to the power supply to be powered by the power supply.

In one embodiment, the fracturing system includes a plurality of fracturing apparatuses, the plunger pump of at least one fracturing apparatus is replaced with an electric generator to form at least a part of the power supply.

In one embodiment, the electric generator is fixed on a second base provided with a second forklift slot.

For example, the fracturing system further includes a measuring truck, the peripheral apparatus includes a sand mixing apparatus, a plurality of fracturing apparatuses are provided, the measuring truck, the sand mixing apparatus, and the plurality of fracturing apparatuses are connected in sequence, and a last fracturing apparatus is connected with the measuring truck to form a ring-shaped network.

For example, the measuring truck includes a network switch, the network switch of the measuring truck is configured to serve as the network communication manager to manage the communication of the ring-shaped network in real time.

BRIEF DESCRIPTION OF THE DRAWINGS

In order to clearly illustrate the technical solution of the embodiments of the present disclosure, the drawings of the embodiments will be briefly described in the following. It is obvious that the described drawings are only related to some embodiments of the present disclosure and thus are not construed as any limitation to the present disclosure.

DETAILED DESCRIPTION

Figure 1A:
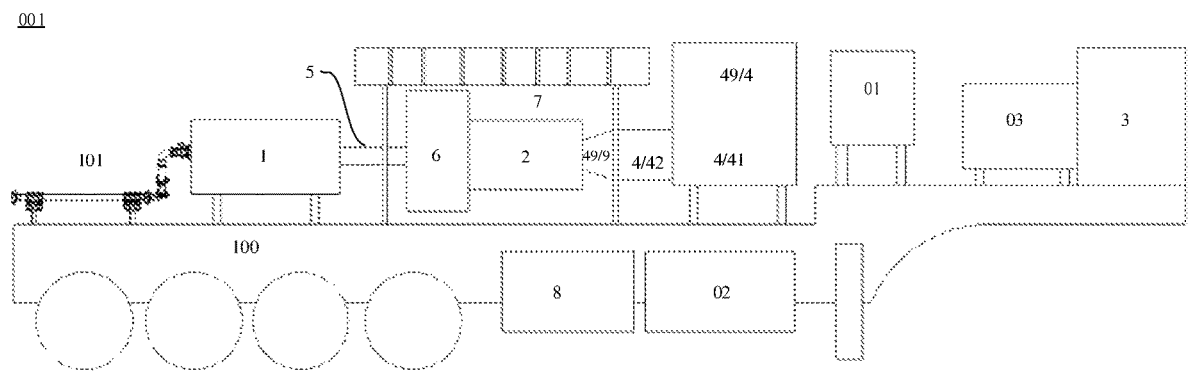
FIG. 1A is a schematic diagram of a turbine fracturing apparatus.

For more clear understanding of the objectives, technical details and advantages of the embodiments of the present disclosure, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise", "comprising", "include", "including", etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the described object is changed, the relative position relationship may be changed accordingly.

In the turbine-driven fracturing well site layout, there is not only turbine engine using fuel gas, but also engine using fuel oil, which brings inconvenience to both environmental protection and control of the fracturing apparatus.

In the electrically-driven fracturing well site layout, all apparatus is driven electrically. If the generator or the variable-frequency drive is malfunctioning, the entire well site will be down and the fracturing operation will be interrupted, causing danger. Compared with turbine apparatus, electricity generating apparatus which uses gas or oil as power fuel reduces efficiency due to an intermediate step of energy conversion.

In the conventional fracturing well site layout, all apparatus uses oil as power fuel. Both oil combustion pollution and noise pollution are significant and inevitable. There are disadvantages such as high cost, low fuel utilization efficiency, loud noise and high risk of sudden halt of operation existed in the conventional fracturing well site layout.

The existing turbine fracturing apparatus has at least one of the following shortcomings.

1. Existing turbine fracturing apparatus, a diesel engine is installed to provide power for the whole machine, such as turbine engine start-up unit, lubricating unit, cooling unit, air supply unit, ventilating unit, and other units, which has disadvantages such as high cost and environmental pollution.

2. In the turbine fracturing well site, the existing sand conveying apparatus, sand mixing apparatus, fracturing fluid mixing apparatus, and other apparatus are all driven by diesel engines, which also have the disadvantages of high cost, high noise, and environmental pollution.

3. Existing all electric-driven well sites use grid power (grid electricity), variable-frequency drive, switch cabinet and other apparatus to provide power for the electric motor, and the electric motor drives a fracturing pump (plunger pump) to perform a fracturing operation. However, in the actual application process, there are problems such as frequent failures of electrical apparatus like the variable-frequency drive and etc. The risk of operation shutdown is high, which seriously affects the efficiency of wellsite operations.

4. The well site occupies a large space.

5. The power supply of existing well sites is unstable, and there are serious unreliability hidden dangers for fracturing operations, especially plunger pump operations.

6. Existing turbine fracturing apparatus uses motors as driving components for lubrication, cooling, turbine engine startup, and air supply, and must be equipped with a hydraulic unit. The hydraulic unit needs a power source, and a power device, such as an engine, that provides high-pressure for the hydraulic unit is further required. The engine is used as an accessory apparatus to provide pressure for the hydraulic unit. In such a case, not only the apparatus has more accessories, but also the cost of the apparatus is increased.

7. The existing turbine engine uses a hydraulic starting form, and the auxiliary engine must be started before starting the turbine engine.

Figure 1B:
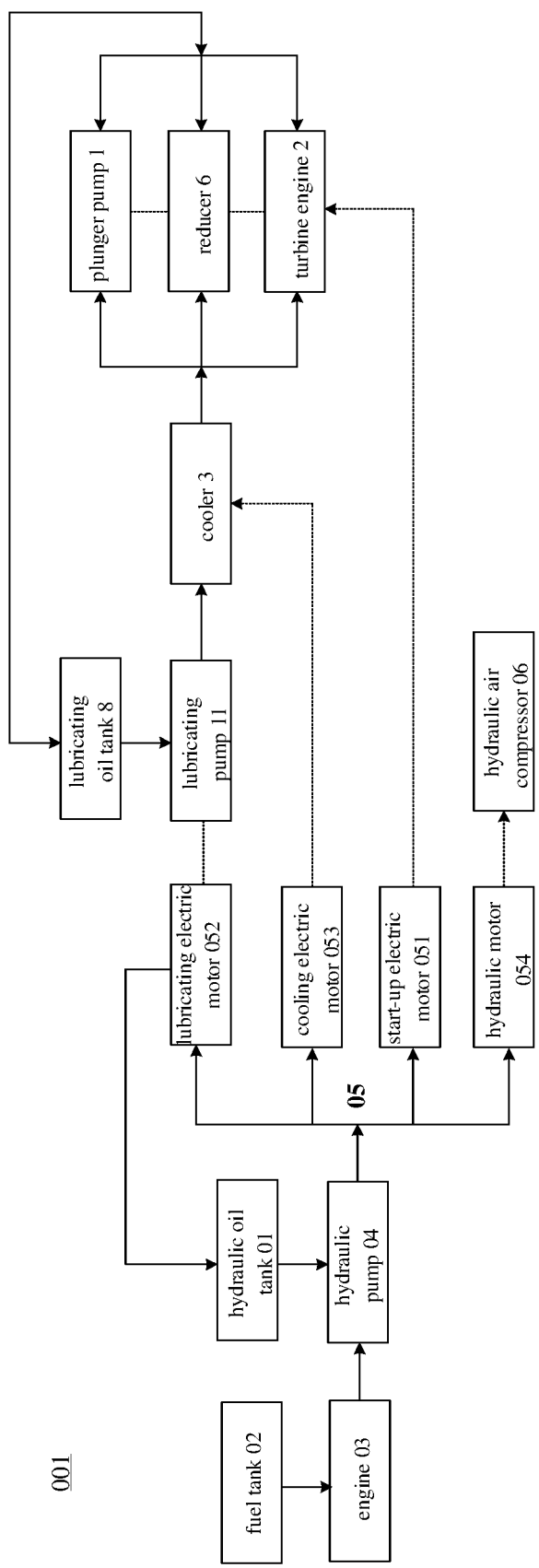
FIG. 1B is a schematic diagram of a principle of a turbine fracturing hydraulic apparatus.

FIG. 1A is a schematic diagram of a turbine fracturing apparatus, and FIG. 1B is a schematic diagram of a principle of a turbine fracturing hydraulic system. As illustrated in FIG. 1B, the solid line refers to the hydraulic fluid, the arrow refers to the direction of the hydraulic fluid, and the dashed line refers to the mechanical connection between the components. Referring to FIG. 1A and FIG. 1B, the turbine fracturing apparatus 001 includes a vehicle body 100, a hydraulic oil tank 01, a fuel tank 02, an engine 03, a plunger pump 1, a turbine engine 2, a cooler 3, a muffler 4, a reducer 6, and lubricating oil tank 8 that are provided on the vehicle body 100. For example, the engine 03 includes a diesel engine, and the fuel tank 02 includes a diesel tank.

As illustrated in FIG. 1A, the plunger pump 1 is connected with the turbine engine 2 through the reducer 6. A coupling 5 is provided between the plunger pump 1 and the reducer 6. The reducer 6 includes a gearbox and a gear structure located in the gearbox. One end of the turbine engine 2 is connected with the plunger pump 1 through the gearbox to drive the plunger pump to suck in low-pressure fracturing fluid and discharge a high-pressure fracturing fluid, that is, the plunger pump 1 is configured to pressurize the fracturing fluid to form high-pressure fracturing fluid. As illustrated in FIG. 1A, the other end of the turbine engine 2 is connected with an exhaust assembly 49, which includes an exhaust pipe 9 and a muffler 4; the exhaust pipe 9 is connected with the turbine engine 2 and is configured to discharge exhaust gas. The muffler 4 is connected with the exhaust pipe 9 and is configured to reduce exhaust noise. The fuel tank 02 supplies oil to the engine 03, the engine 03 is connected with a hydraulic pump 04 (not illustrated in FIG. 1A, refer to FIG. 1B), and the hydraulic oil tank 01 is connected with a hydraulic pump 04 (refer to FIG. 1B). For example, the fracturing fluid may also be referred to as a fracturing liquid.

FIG. 1A illustrates a muffling compartment 7. As illustrated in FIG. 1A, the turbine engine 2 and the reducer 6 are located in the muffling compartment 7, and the muffling compartment 7 is configured to reduce noise. FIG. 1A also illustrates the high-pressure manifold 101. For example, the high-pressure manifold 101 is configured to allow high-pressure fracturing fluid to flow therein.

As illustrated in FIG. 1B, the hydraulic pump 04 supplies oil to the actuating motor 05 of the turbine fracturing apparatus. The actuating motor 05 includes a start-up electric motor 051, a lubricating electric motor 052, a cooling electric motor 053, and a hydraulic motor 054. The lubricating electric motor 052 is connected with the lubricating pump 11 to drive the lubricating pump 11 to convey the lubricating oil from the lubricating oil tank 8 to the plunger pump 1, the reducer 6, and the turbine engine 2 for lubrication. For example, the vehicle body 100 includes a semi-trailer, but is not limited thereto.

As illustrated in FIG. 1B, the cooling electric motor 053 drives the cooler 3, the start-up electric motor 051 is connected with the turbine engine 2 to start up the turbine engine 2, and the hydraulic motor 054 drives the hydraulic air compressor 06.

Turbine fracturing apparatus 001 uses an auxiliary engine as a power source to drive the lubrication, cooling, turbine engine start, air supply and other components of the whole machine. The shortcomings of the turbine fracturing apparatus 001 are: 1) the size of the whole vehicle is long, which is not conducive to well site transportation and market promotion; 2) using diesel as auxiliary power fuel, causing certain environmental pollution; 3) low efficiency of the hydraulic unit.

Therefore, there is a need to provide a fracturing apparatus and a fracturing system having the fracturing apparatus to at least partially solve the above-mentioned problems.

The embodiment of the present disclosure provides a fracturing apparatus and a fracturing system with the fracturing apparatus, which can be used for field fracturing operation of oil and gas fields. For example, the fracturing apparatus and the fracturing system with the fracturing apparatus can be used for the well site layout and process implementation scheme of hydraulic fracturing operation, and can be used in the fracturing well site, mainly for the operation of turbine fracturing well site.

Figure 2A:
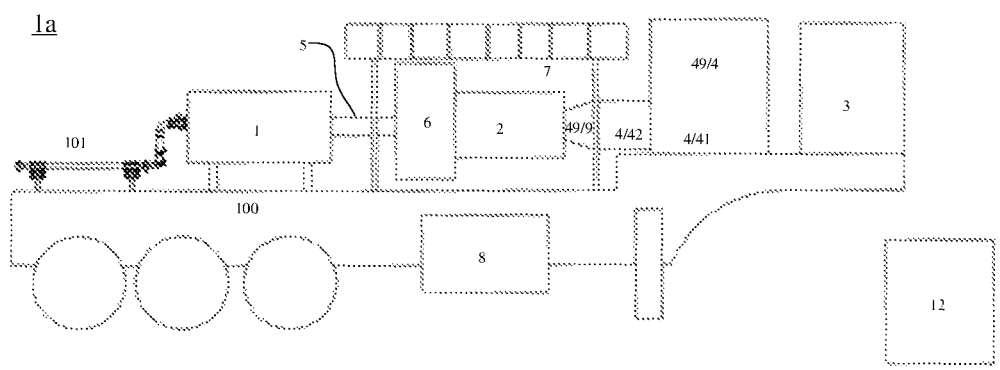
FIG. 2A is a schematic diagram of a fracturing apparatus provided by an embodiment of the present disclosure.
Figure 2B:
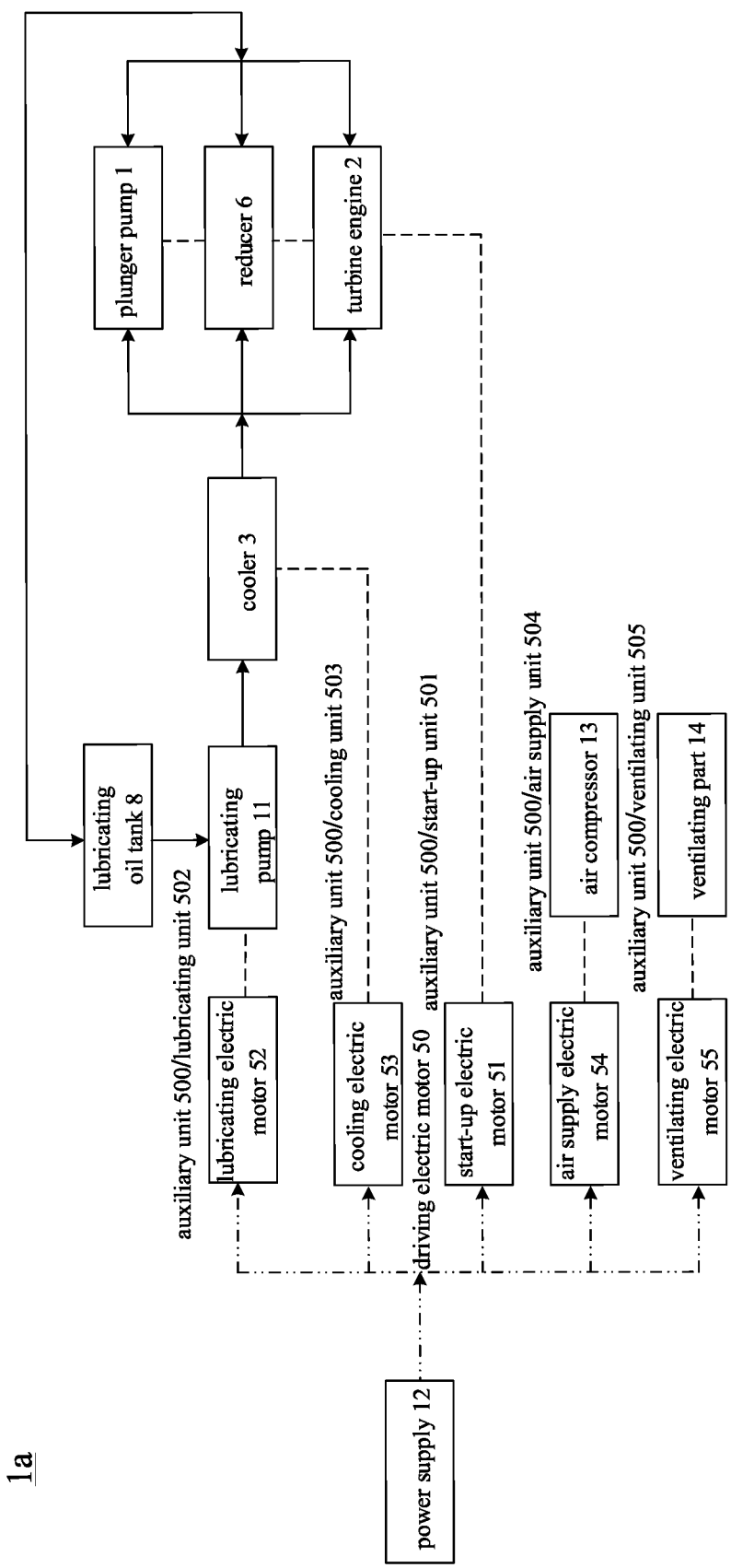
FIG. 2B is a schematic diagram of a principle of a fracturing apparatus provided by an embodiment of the present disclosure.

FIG. 2A is a schematic diagram of a fracturing apparatus provided by an embodiment of the present disclosure, and FIG. 2B is a schematic diagram of a principle of a fracturing apparatus provided by an embodiment of the present disclosure. In FIG. 2B, the solid line refers to the hydraulic fluid, the arrow refers to the direction of the hydraulic fluid, the dotted line refers to the mechanical connection between components, and the two-dot chain line refers to the electric power supply direction.

As illustrated in FIG. 2A and FIG. 2B, the fracturing apparatus 1a mainly includes a power supply 12, a vehicle body 100, a turbine engine 2, a plunger pump 1, and an auxiliary unit 500. As illustrated in FIG. 2B, the auxiliary unit 500 includes at least one selected from the group consisting of a start-up unit 501, a lubricating unit 502, a cooling unit 503, an air supply unit 504, and a ventilating unit 505. For example, the turbine engine 2, the plunger pump 1, the cooling unit 503, and the lubricating unit 502 are provided on the vehicle body 100.

For example, as illustrated in FIG. 2B, the auxiliary unit 500 includes a driving electric motor 50 and is configured to provide an auxiliary function to the fracturing apparatus, for example, the auxiliary function includes at least one selected from the group consisting of a start-up assist function, a lubricating function, a cooling function, a ventilation function, and an air supply function.

For example, as illustrated in FIG. 2B, the power supply 12 is electrically connected with the driving electric motor 50 of the auxiliary unit 500 and configured to provide a driving power to the auxiliary unit 500.

For example, as illustrated in FIG. 2B, the driving electric motor 50 includes at least one selected from the group consisting of a start-up electric motor 51, a lubricating electric motor 52, a cooling electric motor 53, an air supply electric motor 54, and a ventilating electric motor 55. For example, one driving electric motor is provided for each auxiliary unit (each of the start-up unit 501, the lubricating unit 502, the cooling unit 503, the air supply unit 504, and the ventilating unit 505). For example, each auxiliary unit is electrically driven and directly driven by the power supply. For example, no hydraulic unit is provided in the auxiliary unit 500. For example, the auxiliary unit 500 is not provided with a hydraulic pump, nor is a fuel tank and an engine for driving the hydraulic pump provided. Compared with the fracturing apparatus 001 illustrated in FIG. 1A and FIG. 1B, the fracturing apparatus 1a provided by the embodiment of the present disclosure does not have the hydraulic pump 04, nor does it have the fuel tank 02 and the engine 03 for driving the hydraulic pump 04.

In the fracturing apparatus 1a provided by the embodiment of the present disclosure, the auxiliary unit is directly driven in an electrically driven manner. Each auxiliary unit can be provided with an electric motor, which can realize point-to-point driving, minimize energy waste, the electric motor can be powered off without inputting power thereto when it is not at work, so as to realize comprehensive and reasonable distribution of energy consumption.

According to the embodiment of the present disclosure, the turbine engine is used as the main power source for fracturing operation, and the power supply is used to provide power for the auxiliary unit in an electrically driven manner, which can make the overall layout of fracturing apparatus more compact.

For example, in some embodiments, the turbine engine is driven by natural gas, the fracturing apparatus as a whole uses clean energy, there is no environmental pollution, and the maximum utilization of efficiency can be realized.

For example, as illustrated in FIG. 2A, the turbine engine 2 is connected with the plunger pump 1 through a gearbox, which is used to drive the plunger pump 1 to operate to convert low-pressure fracturing fluid into high-pressure fracturing fluid and then convey the high-pressure fracturing fluid to the wellhead. For example, as illustrated in FIG. 2B, the turbine engine 2 is provided with a start-up unit 501, the start-up unit 501 includes a start-up electric motor 51 having a main function of starting up the turbine engine, so as to realize the normal operation of the turbine engine and provide power for the fracturing pump operation. For example, as illustrated in FIG. 2B, the start-up electric motor 51 is configured to directly start up the turbine engine 2, and the start-up electric motor 51 is directly connected with the turbine engine 2. Of course, in other embodiments, the start-up electric motor 51 can be used to drive a hydraulic unit which is used to start up the turbine engine. For example, the hydraulic unit includes a hydraulic pump and a hydraulic motor.

For example, in some embodiments, the turbine engine 2 is driven by fuel or gas, and is directly started up in an electrically driven manner. For example, in the case where the turbine engine 2 is driven by fuel, a fuel tank is provided.

For example, as illustrated in FIG. 2A and FIG. 2B, the lubricating unit 502 includes a lubricating pump 11, a lubricating oil tank 8, and a lubricating electric motor 52. The main function of the lubricating electric motor 52 is to provide a driving force to the lubricating oil, so that the lubricating oil in the lubricating oil tank 8 can be delivered to the lubricating point. For example, the lubricating electric motor 52 is configured to drive the lubricating pump 11 to deliver the lubricating oil in the lubricating oil tank 8 to the lubricating point. For example, the lubricating point may be at least one of the plunger pump 1, the turbine engine 2, and the reducer 6. For example, the lubricating point may also include an electric motor. For example, as illustrated in FIG. 2B, the lubricating electric motor 52 is directly connected with the lubricating pump 11. For example, the lubricating pump 11 is directly driven in an electrically driven manner.

For example, as illustrated in FIG. 2B, the cooling unit 503 includes a cooling electric motor 53 and a cooler (cooling part) 3. The main function of the cooling electric motor 53 is to provide a driving force to the cooler 3, so as to cool the lubricating oil. For example, the cooling electric motor 53 is configured to drive the cooler 3 to provide a driving force for cooling the lubricating oil. For example, the cooler 3 is configured to cool the lubricating oil and reduce the temperature of the lubricating oil. For example, as illustrated in FIG. 2B, the cooling electric motor 53 is directly connected with the cooler 3. For example, the cooler 3 is directly driven in an electrically driven manner. For example, the cooler 3 includes a fan, but is not limited thereto.

For example, as illustrated in FIG. 2B, the air supply unit 504 includes an air supply electric motor 54 and an air compressor 13. For example, the air supply electric motor 54 is directly connected with the air compressor 13. The air compressor 13 is directly driven in an electrically driven manner. The air compressor 13 is an electrically controlled air compressor. The air supply electric motor 54 mainly provides a driving force for the air compressor 13 and provides air (compressed air) with a certain pressure for the turbine engine, thus realizing the use of dual fuels for the turbine engine.

For example, as illustrated in FIG. 2B, the ventilating unit 505 includes a ventilating electric motor 55 and a ventilating part 14. For example, the ventilating electric motor 55 is directly connected with the ventilating part 14. The ventilating part 14 is directly driven in an electrically driven manner. The ventilating electric motor 55 is configured to drive the ventilating part 14. For example, the ventilating part 14 includes a ventilating blade, but is not limited thereto. For example, the ventilating unit 505 is configured to reduce the temperature of the air in the muffling compartment 7, so that the air in the muffling compartment 7 can be circulated. For example, the ventilating part 14 includes a fan, but is not limited thereto.

For example, the power supply 12 supplies electric power to the lubricating electric motor, the cooling electric motor, the ventilating electric motor, the air supply electric motor, and the start-up electric motor, respectively. For example, the power source 12 may be at least one selected from the group consisting of a generator, a grid electricity, a fuel cell and an energy storage battery.

For example, as for the start of turbine engine, the existing fracturing apparatus is driven by motor, starting the motor needs to consume a part of power, and the hydraulic unit itself also consumes a part of power, which leads to the increase of energy consumption of the whole apparatus. However, if the turbine engine is driven by electric motor, and is controlled by variable-frequency driving, point-to-point driving can be realized, and the energy waste can be minimized. After starting is completed, the electric motor can be cut off, and then there is no need to input power to this electric motor, so as to realize comprehensive and reasonable distribution of energy consumption. The same is true for other auxiliary units, which can be referred to the description of the start-up unit and will not be repeated herein.

According to the present disclosure, an auxiliary engine can be omitted from the fracturing apparatus, and hydraulically driven actuators are all substituted by electrically driven actuators, which has at least one of the following advantages.

1) It is possible to reduce the size of the carrier and make the layout of the fracturing apparatus more compact, which facilities wellsite transportation and market promotion.

The turbine fracturing apparatus has a higher unit-power compared with the conventional diesel driven apparatus, which greatly saves the occupied space at the well site. The diesel engine and the fuel tank thereof are removed, and other components such as the hydraulic oil tank and the hydraulic motor are removed, such that the number of components and parts of the entire apparatus is reduced, realizing size reduction of the fracturing apparatus. The design is optimized with the function remaining unchanged and the size being reduced. It is possible to realize large-scale operation at small well field because the layout of the well site is more convenient.

2) The entire apparatus uses clean energy, and environment pollution is eliminated.

For example, in some embodiments, the turbine engine uses natural gas and the remaining components are all driven by electric motors. The power source of the electric motors can be electrical power, all of which are clean energy.

3) Each actuator can be equipped with an electric motor configured for driving. This solution minimizes the energy waste caused by the hydraulic system itself, thereby achieving maximum efficiency.

For example, the turbine engine is started by a motor in the existing fracturing apparatus, the start-up of the motor needs to consume a part of power, and the hydraulic unit also needs a part of power, which leads to an increase in energy consumption of the whole apparatus. While if the turbine engine is started by an electric motor and is controlled by a variable-frequency driving, thereby achieving point to point driving with less waste of energy consumption. The electric motor can be powered off without being input with power after the start-up of the turbine engine, thereby realizing a comprehensive and reasonable distribution of energy consumption.

4) All the lubricating, cooling, turbine engine start-up, and air supply of the turbine fracturing apparatus are driven by electric motors. For example, these electric motors can be powered by a 380V power supply which has a wide range of sources, such as energy storage battery, fuel cell, grid electricity and generator, etc. There is no need for the 10 kV high voltage power at the well site, thereby improving reliability.

For example, the conventional electrically-driven well site is equipped with at least four power generation assemblies with a predetermined power. Once the power generation assemblies are malfunctioning, the entire well site will be down. While according to the present disclosure, only one power generation assembly with the predetermined power can meet the electricity demand of the well site, and the plunger pump with the largest energy consumption demand uses clean energy such as natural gas as fuel. This optimizes energy utilization in fracturing operations, reduces the failure rate of well site and increases reliability of fracturing operations. Of course, in other embodiments, the plunger pump can also use diesel as fuel. For example, the predetermined power of the above-mentioned power generation assembly may be less than 1 MW, or the predetermined power of the power generation assembly may be greater than or equal to 1 MW and less than or equal to 8 MW. For example, the conventional electric drive well site needs to be equipped with four power generation assemblies each of which with a power of 5.8 MW, while according to the embodiment of the present disclosure, only one power generation assembly with a power of 5.8 MW is needed to meet the well site power demand. Of course, the power of power generation assembly can be adjusted as needed.

Figure 3A:
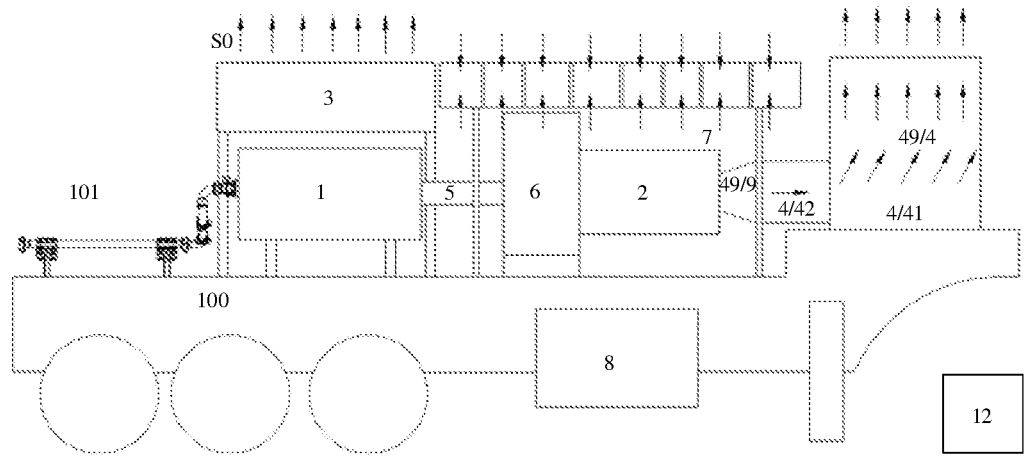
FIG. 3A is a schematic diagram of a fracturing apparatus provided by an embodiment of the present disclosure.

FIG. 3A is a schematic diagram of a fracturing apparatus provided by an embodiment of the present disclosure. The arrow direction in FIG. 3A is the air flow direction. As illustrated in FIG. 3A, the fracturing apparatus 1b includes a plunger pump 1 and a turbine engine 2. The turbine engine 2 is configured to drive the plunger pump 1. One end of the turbine engine 2 is connected with the plunger pump 1 through the reducer 6 to drive the plunger pump to suck in low-pressure fracturing fluid and discharge high-pressure fracturing fluid, that is, the plunger pump 1 is configured to pressurize the fracturing fluid to form high-pressure fracturing fluid.

For example, as illustrated in FIG. 3A, the cooler 3 is configured to cool the lubricating oil to lower the temperature of the lubricating oil. As illustrated in FIG. 3A, the cooler 3 is arranged at a side of the muffler 4. For example, the cooler 3 is arranged directly above the plunger pump 1. Because the height of the vertical part of the muffler 4 is large, although the air discharged from the cooler 3 in FIG. 3A is upward, it can also be seen that the air discharged from the cooler 3 flows toward the muffler 4, so that the flow speed of the air outside the muffler 4 can be increased, which is conducive to rapid reduction of the temperature. Arranging the cooler 3 on plunger pump can reduce the length of lubricating oil pipeline, save space layout and make the whole apparatus more compact.

For example, in the embodiment of the present disclosure, referring to FIG. 2B and FIG. 3A, the lubricating oil pipeline is arranged to pass through various lubricating points, and is connected with the lubricating pump 11, and is heat-dissipated through the cooler 3. For example, the lubricating pump 11 is driven by the lubricating electric motor 52.

As illustrated in FIG. 3A, the other end of the turbine engine 2 is connected with an exhaust assembly 49 which includes an exhaust pipe 9 and a muffler 4. The exhaust pipe 9 is connected with the turbine engine 2 and configured to exhaust an exhaust gas. The muffler 4 is connected with the exhaust pipe 9 and is configured to reduce exhaust noise. For example, the turbine engine 2 includes the exhaust pipe 9 to which the muffler 4 is connected. For example, in a direction from a position close to the turbine engine 2 to a position away from the turbine engine 2, the pipe diameter of the exhaust pipe 9 gradually increases to facilitate exhaust gas discharge.

For example, the fracturing apparatus 1b further includes a power supply 12, a vehicle body 100, and an auxiliary unit 500. For the power supply 12, the vehicle body 100 and the auxiliary unit 500, the previous description of the fracturing apparatus 1a can be referred and will not be repeated herein.

In some embodiments, as for the cooling unit 503, the cooler 3 of the fracturing apparatus 1b is also directly connected with the cooling electric motor, which is directly driven by the cooling electric motor, just like the fracturing apparatus 1a.

In some embodiments, as for the start-up unit 501, the turbine engine 2 of the fracturing apparatus 1b is directly connected with the start-up electric motor 51, which is directly driven by the start-up electric motor 51, just like the fracturing apparatus 1a.

In some embodiments, as for the lubricating unit 502, the lubricating pump 11 of the fracturing apparatus 1b is directly connected with the lubricating electric motor 52, which is directly driven by the lubricating electric motor 52, just like the fracturing apparatus 1a.

In some embodiments, as for the air supply unit 504, the air compressor 13 of the fracturing apparatus 1b is directly connected with the air supply electric motor 54, which is directly driven by the air supply electric motor 54, just like the fracturing apparatus 1a.

In some embodiments, as for the ventilating unit 505, the ventilating part 14 of the fracturing apparatus 1b is directly connected with the ventilating electric motor 55, which is directly driven by the ventilating electric motor 55, just like the fracturing apparatus 1a.

In some embodiments, at least one of the cooler 3, the start assist of the turbine engine 2, the lubricating pump 11, the air compressor 13, and the ventilating electric motor 55 of the fracturing apparatus 1b is directly connected with its corresponding electric motor and is directly driven by the electric motor.

In the fracturing apparatus provided by the embodiment of the present disclosure, the actuators, such as the cooler 3, the start assist of turbine engine 2, the lubricating pump 11, the air compressor 13, the ventilating part 14, etc., are directly driven by electric motors. Compared with the way in which electric motors drive hydraulic units, hydraulic units the drive cooler 3, the start assist of turbine engine 2, the lubricating pump 11, the air compressor 13, the ventilating part 14, the energy consumption is low, and the electric motors can be powered off when not driving the actuators, which is conducive to the realization of a comprehensive and reasonable distribution of energy consumption.

Figure 3B:
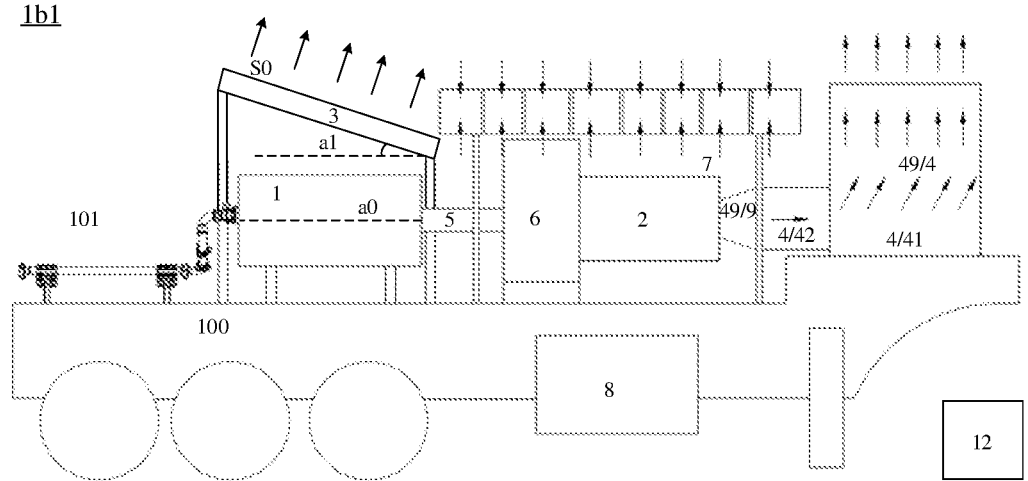
FIG. 3B is a schematic diagram of a fracturing apparatus provided by an embodiment of the present disclosure.

FIG. 3B is a schematic diagram of a fracturing apparatus provided by an embodiment of the present disclosure. As illustrated in FIG. 3B, compared with the fracturing apparatus 1b illustrated in FIG. 3A, in the fracturing apparatus 1b1, the cooler 3 is inclined so as to facilitate the air discharged from the cooler 3 to move to the muffler 4. For example, in order to facilitate the air discharged from the cooler 3 to move to the muffler 4 and facilitate the installation of the cooler and the lubricating oil pipeline, the inclination angle a1 of the cooler 3 is in a range from 10 to 30 degrees. For example, the cooler 3 is disposed obliquely with respect to the surface of the vehicle body 100. For example, the cooler 3 is disposed obliquely with respect to an axis a0 of the plunger pump 1. For example, the air outlet side of the cooler 3 is inclined toward the muffler 4.

Figure 3C:
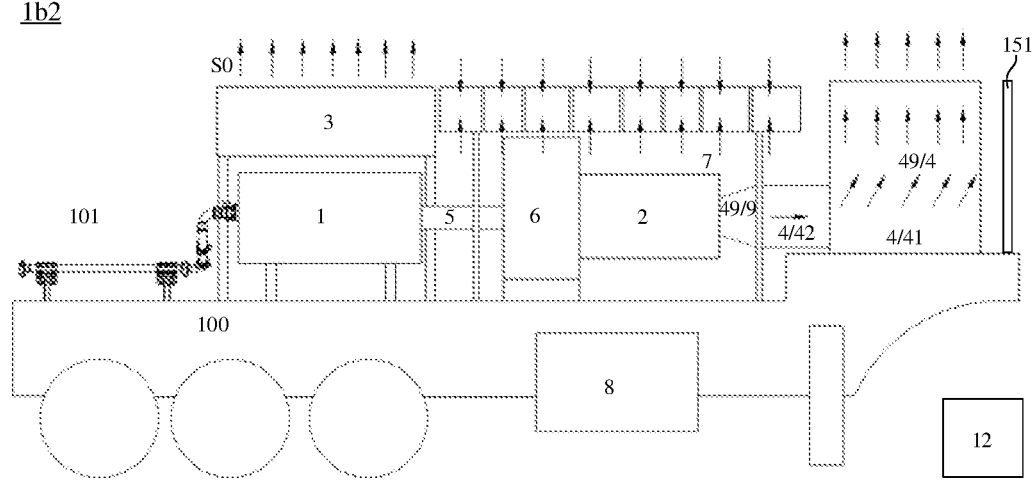
FIG. 3C is a schematic diagram of a fracturing apparatus provided by an embodiment of the present disclosure.

FIG. 3C is a schematic diagram of a fracturing apparatus provided by an embodiment of the present disclosure. As illustrated in FIG. 3C, compared with the fracturing apparatus 1b illustrated in FIG. 3A, the fracturing apparatus 1b2 is provided with a protective baffle 151 outside the muffler 4. For example, the protective baffle 151 may be provided with a weight-reducing hole (not illustrated in the figure). The weight-reducing hole in the protective baffle 151 can refer to the hole 150 in the baffle 15 mentioned later. The protective baffle 151 can play a protective role. The protective baffle 151 is at least provided at least one side of the muffler 4. For example, the baffle 151 may be provided at the other three sides of the muffler 4 except the side connected with the exhaust pipe.

Figure 4:
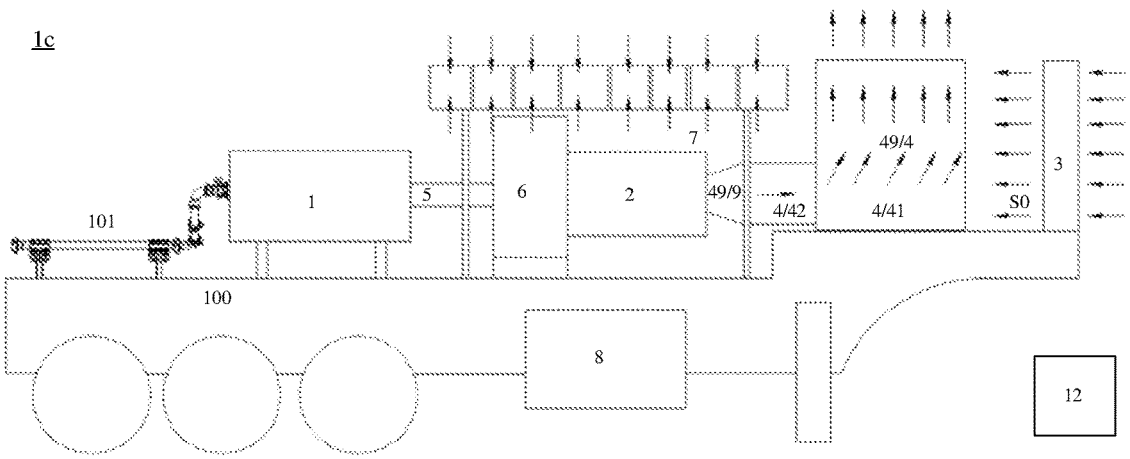
FIG. 4 is a schematic diagram of a fracturing apparatus provided by another embodiment of the present disclosure.

FIG. 4 is a schematic diagram of a fracturing apparatus provided by another embodiment of the present disclosure. The fracturing apparatus 1c differs from the fracturing apparatus 1b in that the cooler 3 is arranged at a side of the muffler 4. As illustrated in FIG. 4, the air discharged from the cooler 3 flows toward the muffler 4. That is, the cooler 3 is configured such that the air discharged from the cooler 3 flows toward the muffler 4. For example, as illustrated in FIG. 4, the cooler 3 is arranged at the side of the muffler 4 away from the exhaust pipe 9. For example, as illustrated in FIG. 4, the cooler 3 is adjacent to the muffler 4.

Because the temperature of the outer surface of the muffler 4 is higher than that of the air discharged from the cooler 3, the air discharged from the cooler 3 can flow toward the muffler 4, thereby increasing the flow speed of the air outside the muffler 4, realizing rapid temperature reduction and air reuse.

Figure 5A:
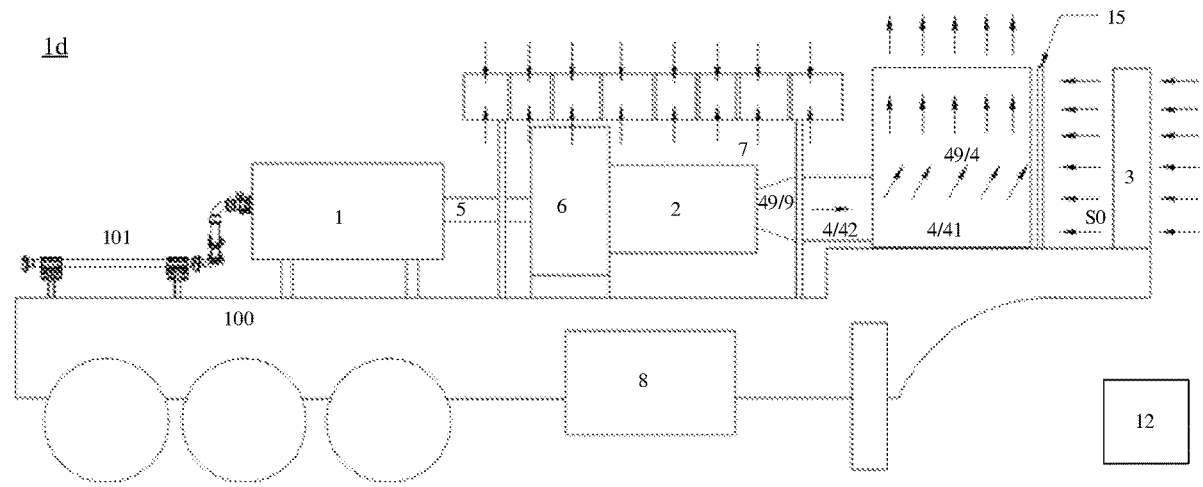
FIG. 5A is a schematic diagram of a fracturing apparatus provided by another embodiment of the present disclosure.
Figure 5B:
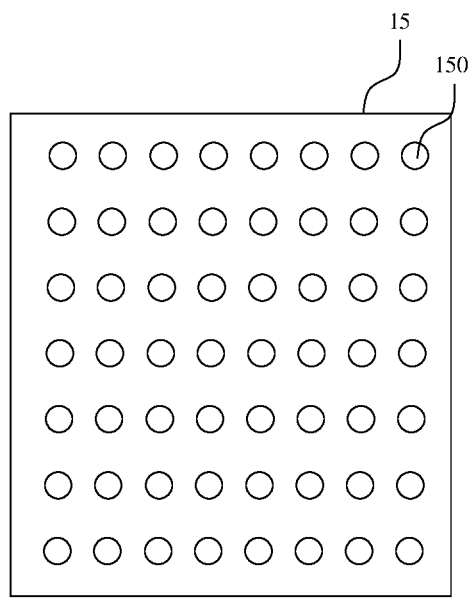
FIG. 5B is a schematic diagram of a baffle in a fracturing apparatus provided by an embodiment of the present disclosure.
Figure 5C:
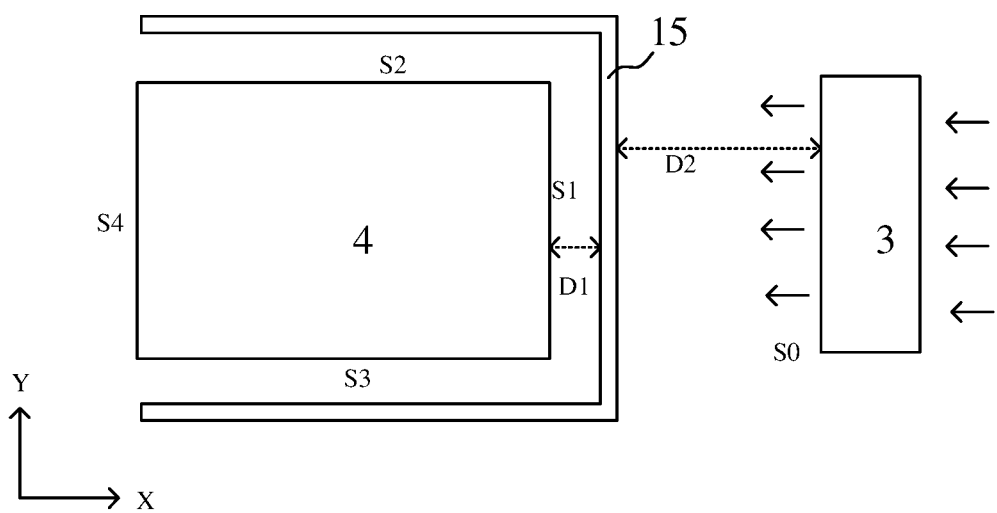
FIG. 5C is a schematic diagram of an arrangement position of a baffle in a fracturing apparatus provided by an embodiment of the present disclosure.
Figure 5D:
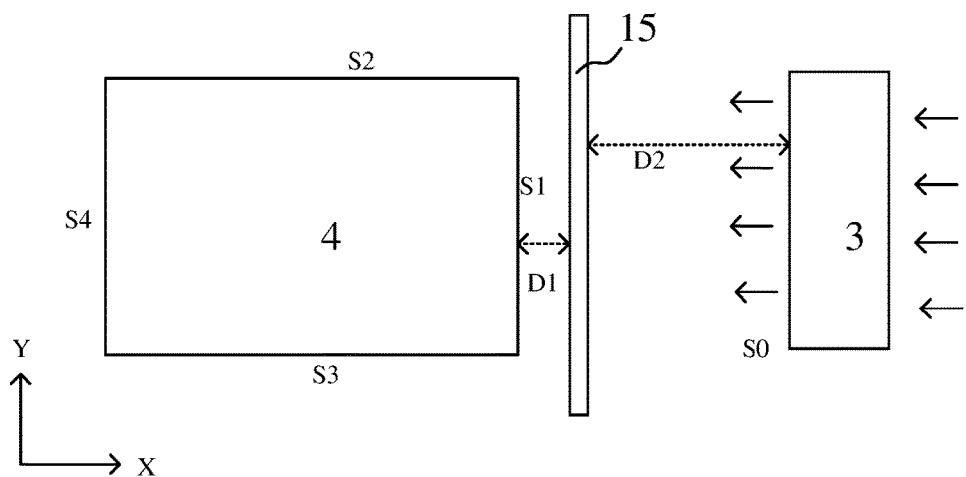
FIG. 5D is a schematic diagram of an arrangement position of a baffle in a fracturing apparatus provided by another embodiment of the present disclosure.

FIG. 5A is a schematic diagram of a fracturing apparatus provided by another embodiment of the present disclosure. FIG. 5B is a schematic diagram of a baffle in fracturing apparatus provided by an embodiment of the present disclosure. FIG. 5C is a schematic diagram of the arranging position of the baffle in a fracturing apparatus provided by an embodiment of the present disclosure. FIG. 5D is a schematic diagram of the arranging position of the baffle in a fracturing apparatus provided by another embodiment of the present disclosure.

For example, compared with the fracturing apparatus 1c illustrated in FIG. 4, the fracturing apparatus 1d illustrated in FIG. 5A is provided with a baffle 15. For example, in order to avoid the influence of the outer surface temperature of the muffler 4 on the cooler 3, a baffle 15 is arranged outside the muffler 4, and the baffle 15 is located at a positon closer to the muffler 4. For example, as illustrated in FIG. 5A, FIG. 5C and FIG. 5D, the baffle 15 is arranged outside the muffler 4 and at least partially between the muffler 4 and the cooler 3. The arrangement of the baffle 15 is beneficial to the maximum reduction of thermal radiation.

Referring to FIG. 3A, FIG. 4 and FIG. 5A, in order to facilitate the arrangement of the cooler 3, the cooler 3 is arranged at a side of the muffler 4.

As illustrated in FIG. 4 and FIG. 5A, the cooler 3 is arranged at a side of the muffler 4, so that a side (air outlet side) S0 of the exhaust air of the cooler 3 faces the muffler 4, so that the exhaust air of the cooler 3 flows toward the muffler 4, and the flow speed of the air outside the muffler 4 is increased, thereby realizing rapid temperature reduction and air reuse.

For example, as illustrated in FIG. 5B, in order to facilitate the air discharged from the cooler 3 to flow toward the muffler 4, the baffle 15 includes a plurality of holes 150, for example, the holes can be circular holes, oblong holes and other structural forms, and the shapes of the holes can be arranged as required, which is not limited here. The baffle illustrated in FIG. 5B will be described by taking the hole 150 as a round hole as an example. For example, the air discharged from the cooler 3 can flow toward the muffler 4 through holes in the baffle 15. Referring to FIG. 3A, FIG. 4, and FIG. 5A, the cooler 3 includes an air outlet side and an air inlet side, which are oppositely arranged. As illustrated in FIG. 3A, the upper side of the cooler 3 is the air outlet side and the lower side of the cooler 3 is the air inlet side. As illustrated in FIG. 4 and FIG. 5A, the left side of cooler 3 is the air outlet side, and the right side of cooler 3 is the air inlet side. For example, air enters from the air inlet side of the cooler 3 and is discharged from the air outlet side of the cooler 3.

For example, referring to FIG. 5A, FIG. 5C and FIG. 5D, an interval is provided between the cooler 3 and the muffler 4, and one side S0 of the cooler 3 that exhausts air faces the muffler 4. One side (air outlet side) S0 of the cooler 3 that exhausts air is illustrated in FIGS. 3A, 3B, 4, 5A and 5C.

For example, referring to FIG. 5B, the baffle 15 includes a plurality of holes 150, and referring to FIG. 5C, the distance D1 between the baffle 15 and the muffler 4 is less than the distance D2 between the baffle 15 and the cooler 3.

For example, as illustrated in FIG. 5C and FIG. 5D, the muffler 4 includes a first side 51, a second side S2, and a third side S3, the first side 51 faces the cooler 3, the second side S2 and the third side S3 are connected with the first side 51, respectively, and the baffle 15 is at least located outside the first side 51 of the muffler 4 to separate the exposed high-temperature part of the muffler 4 from external components.

As illustrated in FIG. 5C, the baffle 15 is located outside the first side 51, the second side S2, and the third side S3 of the muffler 4. Therefore, the exposed high-temperature part of the muffler 4 is separated from external components, and the influence of the muffler 4 on external components such as the cooler 3 can be reduced. For example, external components include, but are not limited to, the cooler 3. FIG. 5C is described with reference to the case where the second side S2 and the third side S3 are provided with the baffle 15, and the length of a part of the baffle 15 outside the second side S2 in the first direction X is larger than that of the second side S2 in the first direction X, and the length of a part of the baffle 15 outside the third side S3 in the first direction X is greater than that of the third side S3 in the first direction X, by way of example. In other embodiments, the part of the baffle 15 outside the second side S2 can also have other lengths in the first direction X, and the part of the baffle 15 outside the third side S3 can also have other lengths in the first direction X.

For example, in the embodiment of the present disclosure, the second direction Y intersects with the first direction X. Further, the second direction Y is perpendicular to the first direction X. For example, the second direction Y and the first direction X are directions parallel with the supporting surface of the carrier. For example, the supporting surface of the carrier is the surface on which various components are placed.

It should be noted that the arrangement position of the baffle 15 is not limited to the case illustrated in FIG. 5C. As illustrated in FIG. 5D, the baffle 15 may be provided only outside the first side S1 of the muffler 4.

As illustrated in FIG. 5C and FIG. 5D, the second side S2 and the third side S3 are oppositely arranged.

As illustrated in FIG. 5C and FIG. 5D, the muffler 4 includes a fourth side S4, which is arranged opposite to the first side S1. For example, the muffler 4 is connected with the exhaust pipe 9 at the fourth side S4.

As illustrated in FIG. 5D, the muffler 4, the baffle 15, and the cooler 3 are sequentially arranged in the first direction X. In some embodiments, in order to better reduce the heat radiation, the size of the baffle 15 in the second direction Y is greater than that of the muffler 4 in the second direction Y, and is greater than that of the cooler 3 in the second direction Y. As illustrated in FIG. 5C, the size of a part of the baffle 15 outside the first side S1 of the muffler 4 in the second direction Y is greater than that of the muffler 4 in the second direction Y, and is greater than that of the cooler 3 in the second direction Y.

For example, the baffle 15 can be made of metal material, but it is not limited to this, and those skilled in the art can choose suitable materials as needed. In some embodiments, the baffle 15 may comprise a steel plate.

In an embodiment of the present disclosure, referring to FIG. 1A, FIG. 3A to FIG. 5A, the muffler 4 may include a first part 41 and a second part 42, and the first part 41 intersects with the second part 42, for example, the first part 41 is perpendicular to the second part 42. For example, the muffler 4 is L-shaped. For example, the side of the muffler 4 may refer to the side of the first part 41 of the muffler. For example, the bottom surface of the first portion 41 of the muffler 4 is located on the vehicle body 100. Of course, in other embodiments, the side surface of the muffler 4 may also refer to the side surface of the whole muffler 4. In this case, the side surface of the muffler 4 may refer to the part of the muffler 4 that is not parallel with the supporting surface of the vehicle body 100.

It should be noted that the fracturing apparatus 1b, the fracturing apparatus 1b1, the fracturing apparatus 1b2, the fracturing apparatus 1c or the fracturing apparatus 1d provided by the embodiments of the present disclosure may not directly use electric drive for the auxiliary unit 500. For example, each unit included in the auxiliary unit 500, for example, at least one of the start-up unit 501, the lubricating unit 502, the cooling unit 503, the air supply unit 504, and the ventilating unit 505, can be hydraulically driven.

Figure 6:
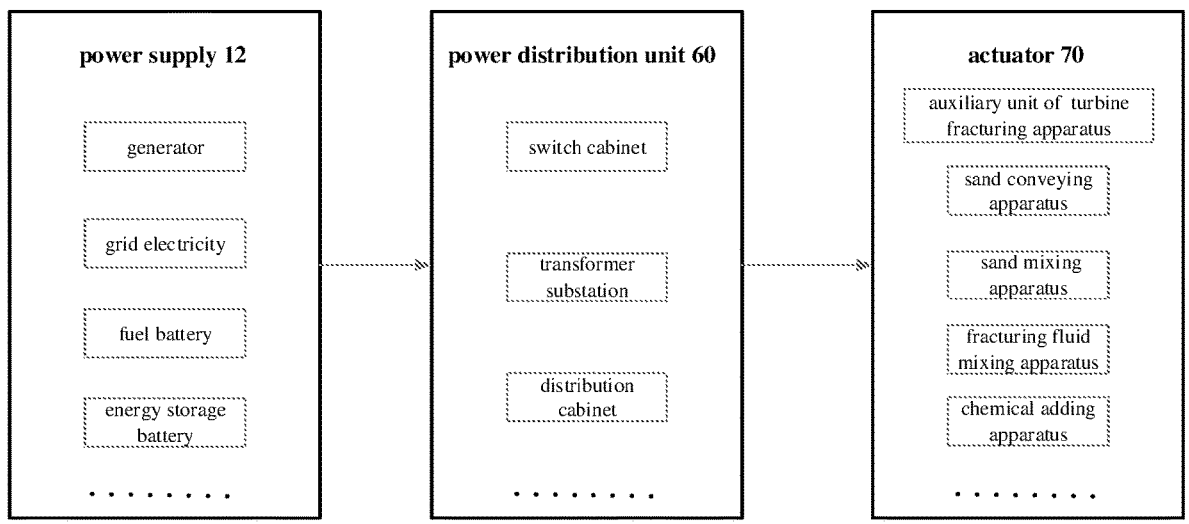
FIG. 6 is a schematic diagram of a power supply of a fracturing apparatus connected with an actuator according to another embodiment of the present disclosure.

FIG. 6 is a schematic diagram of the electric energy transfer process of the auxiliary unit in fracturing apparatus provided by an embodiment of the present disclosure. As illustrated in FIG. 6, the fracturing apparatus includes a power supply 12, a power distribution unit 60, and an actuator 70. For example, the power supply 12 mainly includes grid electricity, chemical batteries, generators, hydrogen power generator, etc. For example, the battery includes at least one of an energy storage battery, an aluminum battery, a fuel battery, a lithium ion secondary battery and a metal hydride nickel battery. For example, the generator can be a gas turbine or an oil-fired power generation assembly.

For example, the power distribution unit 60 mainly includes a switch cabinet, a transformer substation, a power distribution station, etc.

For example, the actuator 70 mainly includes the auxiliary unit of turbine fracturing apparatus, a sand conveying apparatus, a sand mixing apparatus, a fracturing fluid mixing apparatus, a chemical adding apparatus and other apparatus that need electricity. For example, the turbine fracturing auxiliary unit uses the electric motor as the power source to drive the lubricating, cooling, turbine engine starting, air supply, ventilating part and other components of the whole machine.

For example, in the embodiment of the present disclosure, the driving electric motor being directly connected with the actuator refers to that there is no hydraulic unit between the driving electric motor and the actuator. For example, the hydraulic unit includes a hydraulic pump. For example, in the embodiment of the present disclosure, the actuator is an electric drive component instead of a hydraulic drive component.

At least one embodiment of the present disclosure provides a fracturing system including any fracturing apparatus as described above.

Figure 7A:
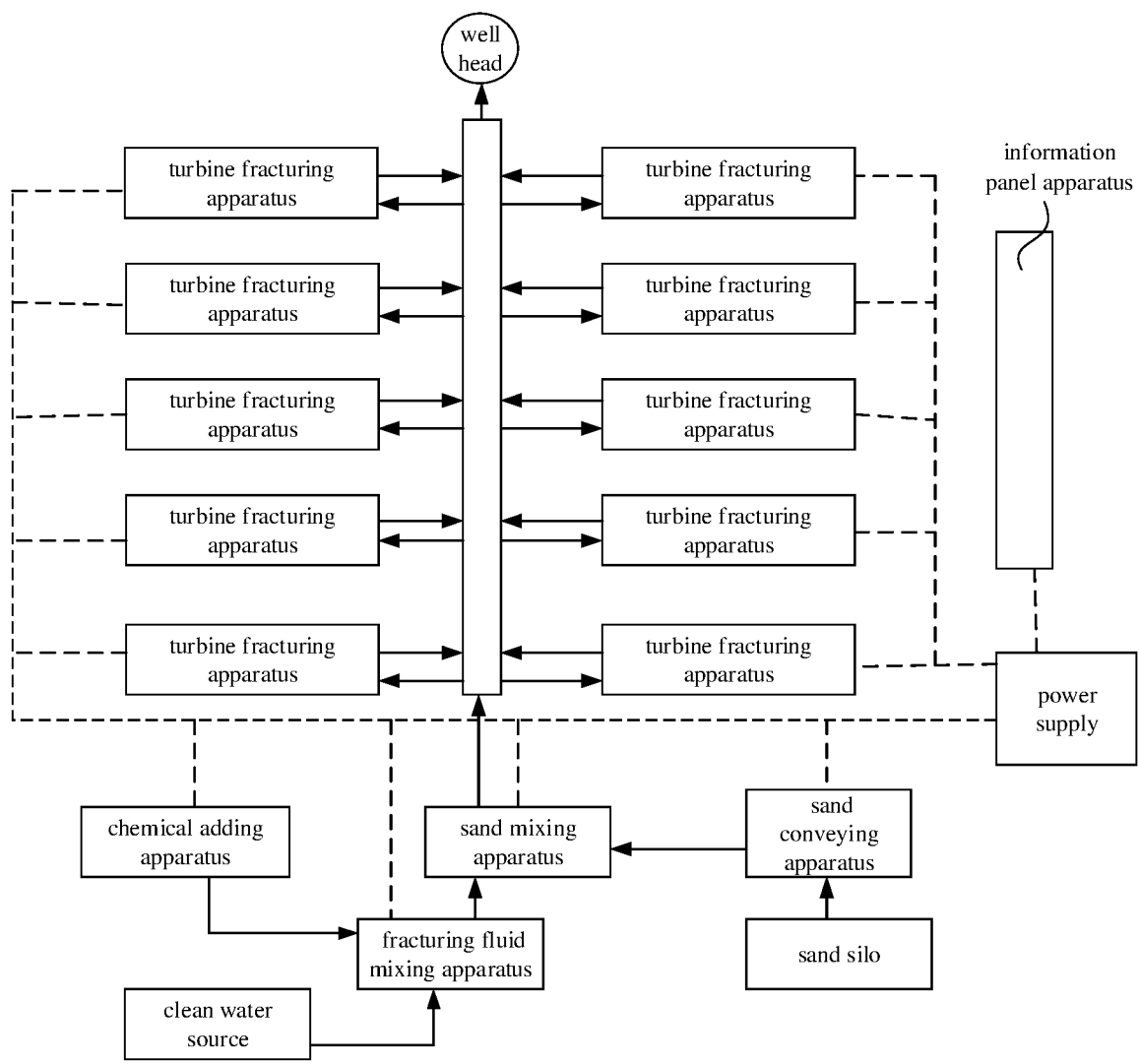
FIG. 7A is a schematic diagram of a fracturing system provided by an embodiment of the present disclosure.

FIG. 7A illustrates a schematic diagram of a fracturing system according to an embodiment of the present disclosure, the fracturing system includes the turbine fracturing apparatus as described above, a manifold apparatus, a sand mixing apparatus, a fracturing fluid mixing apparatus, a sand conveying apparatus, and a sand silo, etc. For example, the sand silo is used to store a proppant which can be conveyed to the sand mixing apparatus through a conveying mechanism. For example, the chemical adding apparatus and a clean water source are coupled to the fracturing fluid mixing apparatus, respectively, where fracturing base fluid is formed. For example, the fracturing base fluid can be then conveyed into the sand mixing apparatus to be fully mixed with the proppant, so as to form fracturing fluid which can be conveyed into the turbine fracturing apparatus via the manifold apparatus. For example, the turbine fracturing apparatus raises the pressure of the fracturing fluid sucked in at low pressure and drains it away to a wellhead at high-pressure.

For example, at least one of the chemical adding apparatus, the sand mixing apparatus, the sand conveying apparatus, and the fracturing fluid mixing apparatus is powered by the power supply. A measuring apparatus which can be vehicle-mounted, semi-trailer-mounted or skid-mounted may control the turbine fracturing apparatus, the turbine generating apparatus, the power supply 12, the manifold apparatus, the sand mixing apparatus, the fracturing fluid mixing apparatus, the sand conveying apparatus, and the sand silo, thus realizing the centralized control of the turbine-electric driven well site.

For example, referring to FIG. 6, the power supply 12 can be electrically connected with a switch cabinet and a transformer substation successively, so as to provide electric power to the electric motors of the sand conveying apparatus, the sand mixing apparatus, the fracturing fluid mixing apparatus, and the auxiliary unit of the turbine fracturing apparatus.

Figure 7B:
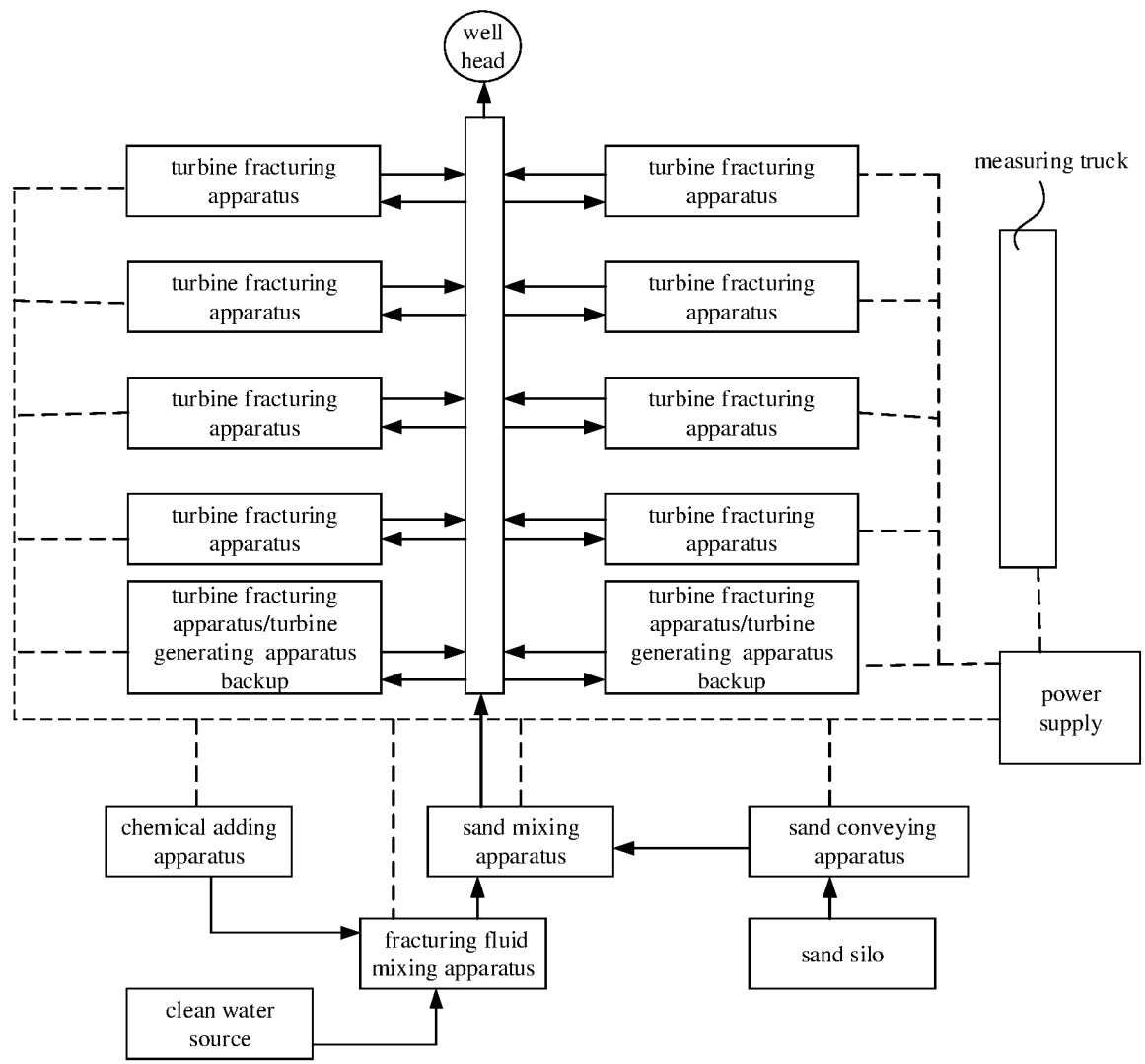
FIG. 7B is a schematic diagram of a fracturing system provided by another embodiment of the present disclosure.
Figure 8:
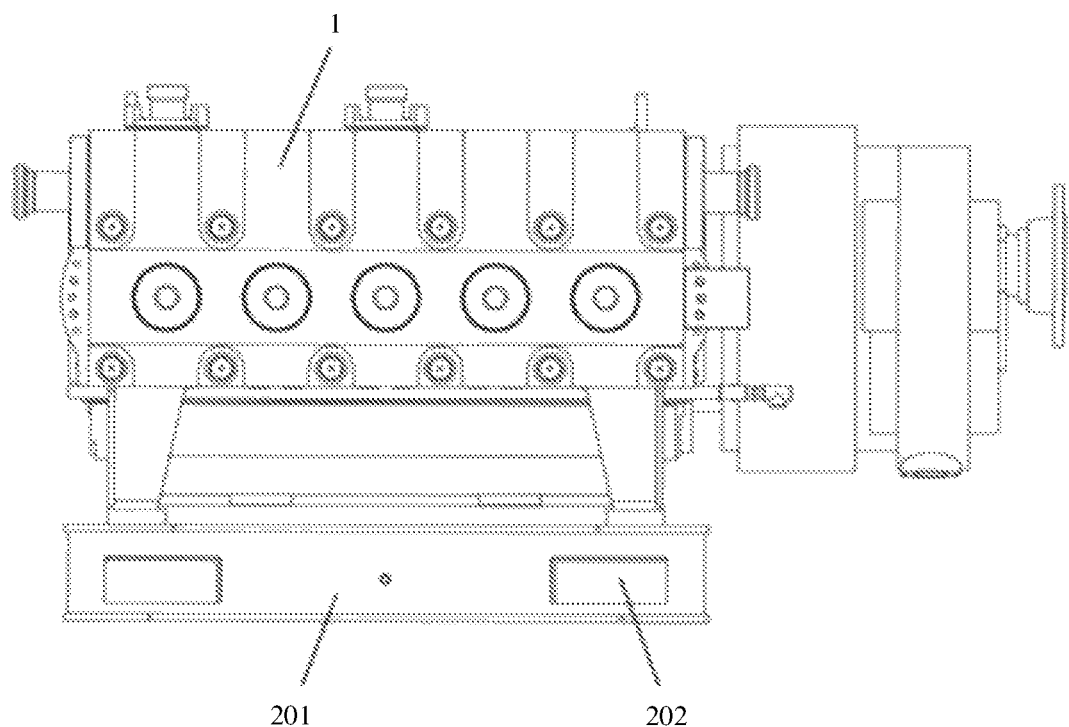
FIG. 8 is a schematic diagram of a plunger pump used in a fracturing apparatus provided by an embodiment of the present disclosure.
Figure 9:
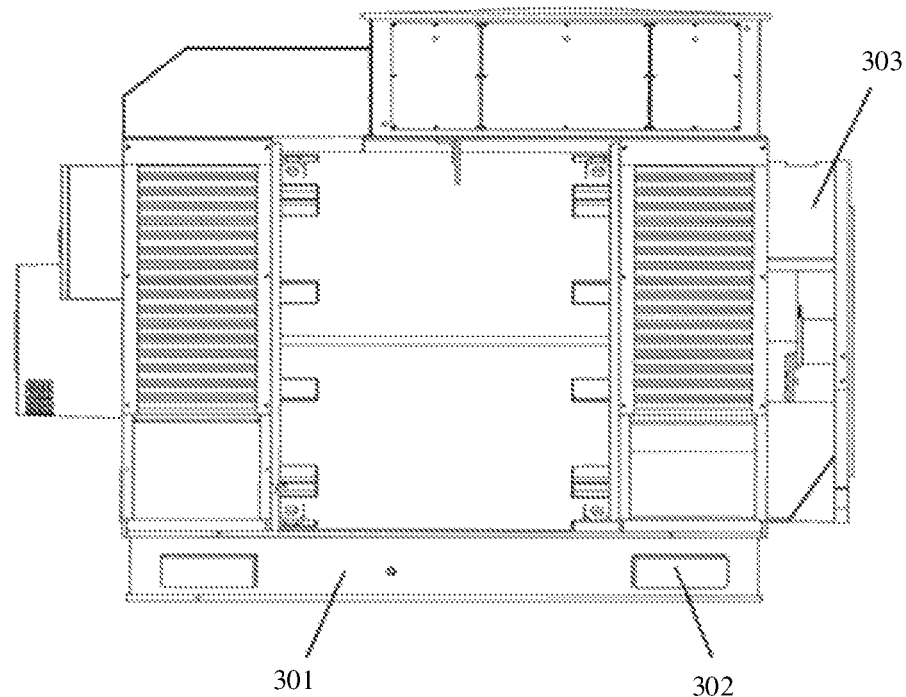
FIG. 9 is a schematic diagram of a generator used in a fracturing apparatus of an embodiment of the present disclosure.

FIG. 7B illustrates a fracturing system provided by an embodiment of the present disclosure. For example, as illustrated in FIG. 7B, the plunger pump of at least one fracturing apparatus is detachably provided, and the plunger pump can be substituted by an electric generator to form at least a part of the power supply 12. To solve the problem of electricity consumption at the well site, a structure for quick-replacement illustrated in FIG. 8 and FIG. 9 is provided, such that the turbine fracturing apparatus can be changed into a turbine generating apparatus quickly. This can be done by replacing the plunger pump with an electric generator.

As illustrated in FIG. 7A and FIG. 7B, the solid line refers to preparing fracturing fluid and the running direction of the fracturing fluid; the dotted line refers to cable control.

As illustrated in FIG. 8, the first base 201 is provided with a first forklift slot 202 to facilitate the replacement of the plunger pump. The plunger pump 1 and the first base 201 are mounted as a whole. The replacement can be performed by removing the fixing bolts between the first base 201 and the vehicle body 100 and then extending a fork of the forklift into the first forklift slot when the plunger pump needs to be replaced.

As illustrated in FIG. 9, likewise, the structure for quick-replacement of the electric generator substantially includes an electric generator 303, a second base 301, and a second forklift slot 302. When the turbine fracturing apparatus needs to be changed into the electric generator apparatus, it is only necessary to remove the plunger pump and then mount the electric generator apparatus quickly to realize the quick replacement from fracturing operation to power generation operation. The reducer coupled to the turbine engine can be set to a predetermined rotate speed to slow down the rotate speed of the turbine engine to a certain range, which can not only meet the requirements of the plunger pump operation, but also drive the generator for power generation. An output cable can be quickly coupled to the control system of the turbine fracturing apparatus, the sand mixing apparatus, the fracturing fluid mixing apparatus, and the sand conveying apparatus via a quick connector.

For example, the turbine generating apparatus adopts the form of one backup and one use to ensure the safety of power supply. Any two turbine fracturing apparatuses in the well site can be used as power supply 12 in the way of replacing the plunger pump quickly with an electric generator through the structure for quick-replacement. In another embodiment, the two mounted turbine generating apparatuses are preferably arranged on both sides of the manifold apparatus to facilitate cable connection. In another embodiment, the two mounted turbine generating apparatuses are preferably arranged symmetrically about the center line of the manifold apparatus, such that the cable laying is more convenient.

It should be noted that the fracturing apparatus provided by the embodiment of the present disclosure may not adopt the structure of adjusting the installation positions of the cooler or adjusting the installation positions of the cooler and muffler as illustrated in FIG. 3A, FIG. 4 and FIG. 5A. That is, in the fracturing apparatus provided by some embodiments of the present disclosure, the cooler may not be arranged above the plunger pump 1, and in the fracturing apparatus provided by some embodiments of the present disclosure, the cooler may not be arranged opposite to the muffler 4. That is, in the fracturing apparatus according to some embodiments of the disclosure, the cooler can be arranged in other ways.

Figure 10:
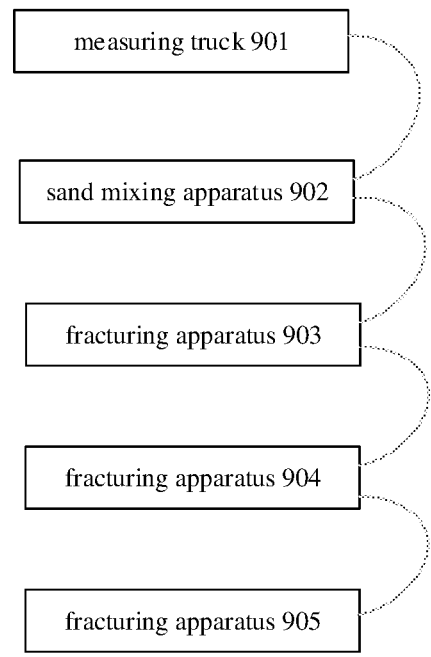
FIG. 10 is a schematic diagram of a network control system of a fracturing system.

FIG. 10 is a schematic diagram of a network control system of a fracturing system. As illustrated in FIG. 10, the fracturing system includes a measuring truck 901, a sand mixing apparatus 902, a fracturing apparatus 903, a fracturing apparatus 904, and a fracturing apparatus 905, which are connected in sequence to form a linear network. This connection mode is serial connection. During the operation, as long as there is a problem with the communication line of one apparatus, the whole system will be abnormal.

Figure 11:
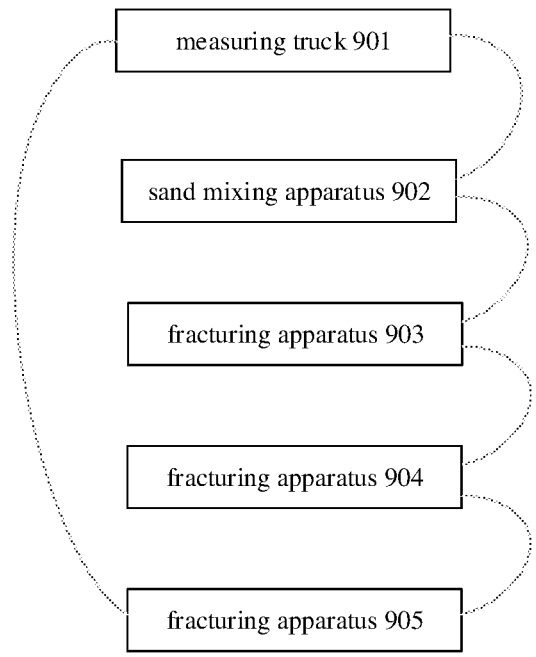
FIG. 11 is a schematic diagram of a network control system of a fracturing system provided by an embodiment of the present disclosure.

FIG. 11 is a schematic diagram of a network control system of a fracturing system provided by an embodiment of the disclosure. As illustrated in FIG. 11, the fracturing system includes a measuring truck 901, a sand mixing apparatus 902, a fracturing apparatus 903, a fracturing apparatus 904, and a fracturing apparatus 905. The measuring truck 901, the sand mixing apparatus 902, the fracturing apparatus 903, the fracturing apparatus 904 and the fracturing apparatus 905 are connected in sequence, and the last fracturing apparatus is connected with the measuring truck 901; the apparatus in the well site form a ring-shaped network.

The fracturing system provided by the embodiment of the present disclose includes a ring-shaped network control system. At the well site, after connecting the measuring truck, the sand mixing apparatus, and the fracturing apparatuses in sequence, and then connecting the last fracturing apparatus with the measuring truck; such that the apparatuses in the well site form a ring-shaped network.

In this ring-shaped network, in the case any disconnection of the communication line occurs, the connection of the apparatuses in the well site will be changed from the ring-shaped connection to the linear-shaped connection, but all apparatuses in the whole system are still connected, which will not affect the operation in the well site.

When the apparatuses form a ring-shaped network, the network switch of the measuring truck serves as the network communication manager to manage the communication on the ring-shaped network in real time.

It should be noted that the number of measuring trucks, sand mixing apparatus, and fracturing apparatus included in the fracturing system provided by the embodiment of this disclosure is not limited to that illustrated in the figure, but can be adjusted as required.

In the case of no conflict, the features in the same embodiment and different embodiments of the present disclosure can be combined with each other.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A fracturing system comprising a fracturing apparatus, the fracturing apparatus comprising:
    a plunger pump configured to pressurize a fracturing fluid to form a high-pressure fracturing fluid;
    a turbine engine coupled to the plunger pump and configured to drive the plunger pump, the turbine engine comprising an exhaust pipe;
    a lubrication unit configured to deliver lubricant to a plurality of lubrication destinations in the fracturing apparatus;
    a cooling unit comprising a heat exchanger and configured to cool the lubricant; and
    a muffler coupled to the exhaust pipe,
    wherein the heat exchanger is disposed on a side of the muffler and configured to discharge a flow of air due to heat-exchange by the heat exchanger towards the muffler.

2. The fracturing system of claim 1, wherein the heat exchanger is disposed on the side of the muffler that is away from the exhaust pipe.

3. The fracturing system of claim 1, wherein the heat exchanger and the muffler are separated by a gap, and a discharging side of the heat exchanger for the flow of air faces the muffler.

4. The fracturing system of claim 1, wherein the fracturing apparatus further comprises a baffle disposed between the heat exchanger and the muffler, wherein:
    the baffle comprising a plurality of through holes; and
    a first separation between the muffler and the baffle is smaller than a second separation between the baffle and the heat exchanger.

5. The fracturing a system of claim 4, wherein:
    the muffler comprises a first side, a second side, and a third side, the second side and the third side being connected to the first side;
    the first side of the muffler faces the heat exchanger;
    the baffle is disposed outside of the first side, the second side, and the third side of the muffler.

6. The fracturing system of claim 1, wherein the heat exchanger is disposed over the plunger pump.

7. The fracturing system of claim 6, wherein the heat exchanger is tiltedly disposed from an operation axis of the plunger pump.

8. The fracturing system of claim 1, wherein:
    the lubrication unit comprises:
        a lubrication electric motor;
        a lubricant pump; and
        a lubricant tank for the lubricant,
    the lubrication electric motor is coupled the lubrication pump and configured to drive the lubricant pump to deliver the lubricant from the lubricant tank to the plurality of lubrication destinations; and
    the cooling unit comprises a cooling electric motor coupled to the heat exchanger and configured to drive the heat exchanger for cooling the lubricant.

9. The fracturing system of claim 8, wherein the fracturing apparatus further comprises a starter configured to start the turbine engine, the starter comprising a starting electric motor.

10. The fracturing system of claim 9, wherein the starter is disposed on the turbine engine and the starting electric motor is coupled to the turbine engine and configured to start the turbine engine.

11. The fracturing system of claim 9, wherein the fracturing apparatus further comprises a combustion air supply unit, the combustion air supply unit comprising an air compressor and an air supply electric motor, wherein the air supply electric motor is coupled to the air compressor and configured to drive the air compressor to supply air with a predetermined pressure to the turbine engine.

12. The fracturing system of claim 11, wherein the fracturing apparatus further comprises a ventilation unit, the ventilation unit comprising a ventilation electric motor and a ventilator, wherein the ventilation electric motor is coupled to the ventilator to drive the ventilator.

13. The fracturing apparatus of claim 12, further comprising a power supply coupled to the lubrication electric motor, the cooling electric motor, the starting electric motor, the air supply electric motor, and the ventilation electric motor.

14. The fracturing system of claim 1, further comprising a set of peripheral components and an electric power source to supply power to the set of peripheral components.

15. The fracturing system of claim 14, wherein:
the set of peripheral components comprise at least one of a fracturing fluid mixer, a sand mixer, and a conveyer;
the fracturing fluid mixer is configured to mix a base fluid for the fracturing fluid;
the sand mixer is configured to mix the base fluid with a proppant to generate the fracturing fluid; and
the conveyer is configured to deliver the proppant stored in a proppant silo to the sand mixer.

16. The fracturing system of claim 15, further comprising a plurality of fracturing apparatuses of claim 15.

17. The fracturing system of claim 16, wherein the set of peripheral components further comprise a measuring truck, wherein the measuring truck, the sand mixer, the fracturing fluid mixer, and the plurality of fracturing apparatuses are connected in sequence to form a ring-shaped network.

18. The fracturing system of claim 17, the measuring truck comprises a network switch, wherein the network switch of the measuring truck is configured to serve as a network communication manager to manage communication of the ring-shaped network in real time.

19. The fracturing system of claim 1, wherein the fracturing apparatus further comprises a carrier on which the plunger pump, the turbine engine, the cooling unit, and the lubrication unit are disposed.

20. The fracturing system of claim 19, wherein the plunger pump is detachably fixed on the carrier.

* * * * *